US012681568B2

(12) United States Patent
Wang

(10) Patent No.: US 12,681,568 B2
(45) Date of Patent: Jul. 14, 2026

(54) HEAD-MOUNTED VIRTUAL REALITY DEVICE

(71) Applicant: Beijing Zitiao Network Technology Co., Ltd., Beijing (CN)

(72) Inventor: Qiang Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/860,845

(22) PCT Filed: Aug. 18, 2023

(86) PCT No.: PCT/CN2023/113818
§ 371 (c)(1),
(2) Date: Oct. 28, 2024

(87) PCT Pub. No.: WO2024/051476
PCT Pub. Date: Mar. 14, 2024

(65) Prior Publication Data
US 2025/0315102 A1      Oct. 9, 2025

(30) Foreign Application Priority Data
Sep. 7, 2022    (CN) .......................... 202211091847.6

(51) Int. Cl.
*G06F 3/01* (2006.01)
*G02B 27/01* (2006.01)
(Continued)

(52) U.S. Cl.
CPC ......... *G06F 3/013* (2013.01); *G02B 27/0179* (2013.01); *G06T 7/55* (2017.01);
(Continued)

(58) Field of Classification Search
CPC ................ G06F 3/013; G02B 27/0179; G02B 2027/0187; G06T 7/55; G06T 7/73; G06T 2207/20221; G06T 2207/30201
See application file for complete search history.

(56) References Cited

U.S. PATENT DOCUMENTS 8,824,779 B1 *  9/2014  Smyth ....................... G06T 7/73
                                                              382/117
10,417,784 B1 *  9/2019  Cavin .................... G06V 40/19
(Continued)

FOREIGN PATENT DOCUMENTS

CN      107424187 A    12/2017
CN      108351514 A    7/2018
(Continued)

OTHER PUBLICATIONS

Search Report mailed Nov. 10, 2023 in International Application No. PCT/CN2023/113818.
(Continued)

*Primary Examiner* — Bryan Earles

(57) ABSTRACT

The present disclosure provides a head-mounted virtual reality device. The head-mounted virtual reality device includes an eye movement recognition assembly and a processor, where the eye movement recognition assembly includes a light source assembly, a first camera, and a second camera. The head-mounted virtual reality device obtains a first eye image and a second eye image including strip-shaped light rays emitted by the light source assembly through the cooperation of the light source assembly, the first camera, and the second camera, the processor determines an eye depth map with depth information based on the first eye image and the second eye image, and then determines coordinates of a center of an iris of the user based on the eye depth map.

14 Claims, 2 Drawing Sheets

(51) Int. Cl.
*G06T 7/55* (2017.01)
*G06T 7/73* (2017.01)

(52) U.S. Cl.
CPC ........ *G06T 7/73* (2017.01); *G02B 2027/0187* (2013.01); *G06T 2207/20221* (2013.01); *G06T 2207/30201* (2013.01)

(56) References Cited

U.S. PATENT DOCUMENTS

| | | | | |
|---|---|---|---|---|
| 11,238,340 | B1 * | 2/2022 | Anderson | ................. G06N 3/02 |
| 2013/0215107 | A1 * | 8/2013 | Kimura | .................. G06T 15/00 |
| | | | | 345/419 |
| 2016/0005179 | A1 * | 1/2016 | Petyushko | ................ G06T 5/50 |
| | | | | 382/154 |
| 2017/0123526 | A1 * | 5/2017 | Trail | ....................... G06V 40/19 |
| 2018/0018515 | A1 * | 1/2018 | Spizhevoy | ........... G06V 40/197 |
| 2019/0196221 | A1 | 6/2019 | El-Hajal et al. | |
| 2024/0069347 | A1 * | 2/2024 | Rong | .................. G02B 27/0172 |
| 2025/0220347 | A1 * | 7/2025 | Brimijoin | ............... G06F 3/017 |

FOREIGN PATENT DOCUMENTS

| | | |
|---|---|---|
| CN | 108475109 A | 8/2018 |
| CN | 108540717 A | 9/2018 |
| CN | 108985172 A | 12/2018 |
| CN | 109963138 A | 7/2019 |
| CN | 112106066 A | 12/2020 |
| CN | 117666136 A | 3/2024 |
| WO | 2021108327 A1 | 6/2021 |

OTHER PUBLICATIONS

Office action received from Chinese patent application No. 202211091847.6 mailed on Apr. 24, 2026, 18 pages (9 pages English Translation and 9 pages Original Copy).

* cited by examiner

130

200

120    110

100

200

120

300

310

HEAD-MOUNTED VIRTUAL REALITY DEVICE

CROSS-REFERENCE TO RELATED APPLICATIONS

The present disclosure is a National Stage of International Application No. PCT/CN2023/113818, filed on Aug. 18, 2023, which claims priority to Chinese Patent Application No. 202211091847.6, filed with the China National Intellectual Property Administration on Sep. 7, 2022 and entitled "HEAD-MOUNTED VIRTUAL REALITY DEVICE". The entire contents of the above applications are incorporated into this application by reference in their entireties.

TECHNICAL FIELD

Embodiments of the present disclosure relate to the field of virtual reality technologies, and in particular, to a head-mounted virtual reality device.

BACKGROUND

With the development of virtual reality (VR) technologies and the continuous improvement in the civilianization of head-mounted virtual reality devices, people can wear head-mounted virtual reality devices to experience virtual scenes and enjoy an immersive experience, greatly enriching the content and quality of life of people.

A head-mounted virtual reality device is a product that integrates a plurality of technologies such as simulation technology, computer graphics, human-computer interface technology, multimedia technology, sensing technology, and network technology, and is a brand-new human-computer interaction means created with the aid of a computer and the latest sensor technology. In the related art, the head-mounted virtual reality device includes an eye tracking apparatus, so that the head-mounted virtual reality device can determine a sight direction and an interpupillary distance of a user based on an eye position of the user.

However, the eye tracking apparatus in the related art has a problem of low accuracy.

SUMMARY

Embodiments of the present disclosure provide a head-mounted virtual reality device to solve the technical problem of low accuracy of an eyeball tracking apparatus in the related art.

Embodiments of the present disclosure provide the following technical solutions to solve the above technical problem.

An embodiment of the present disclosure provides a head-mounted virtual reality device, including an eye movement recognition assembly and a processor, where the eye movement recognition assembly includes a light source assembly, a first camera, and a second camera;

the light source assembly is configured to: when the head-mounted virtual reality device is used, project a plurality of strip-shaped light rays to an eye of a user, where at least some of the strip-shaped light rays are projected to an iris of the user;

the first camera is configured to: when the head-mounted virtual reality device is used, capture a first eye image of the user, where the first eye image includes a reflected pattern formed by the strip-shaped light rays on the eye of the user;

the second camera is configured to: when the head-mounted virtual reality device is used, capture a second eye image of the user, where the second eye image includes a reflected pattern formed by the strip-shaped light rays on the eye of the user;

the processor is in signal connection with the first camera and the second camera, respectively, and is configured to determine an eye depth map with depth information based on the first eye image and the second eye image, and determine coordinates of a center of the iris of the user based on the eye depth map.

In a possible implementation, the second eye image and the first eye image have an overlapping area, where the overlapping area includes an image formed by at least part of the iris;

determining an eye depth map with depth information based on the first eye image and the second eye image includes:

determining a first eye depth map with depth information based on the first eye image, and/or determining a second eye depth map with depth information based on the second eye image;

determining a third eye depth map with depth information based on the first eye image and the second eye image; and fusing the third eye depth map with at least one of the first eye depth map and the second eye depth map to obtain an eye depth map with depth information.

In a possible implementation, two lens barrel assemblies are further included, where the two lens barrel assemblies respectively correspond to two eyes of the user, and when the head-mounted virtual reality device is used, the two lens barrel assemblies display a virtual scene to the user;

one of the two lens barrel assemblies corresponds to one eye movement recognition assembly, and in the lens barrel assembly and the eye movement recognition assembly that correspond to each other, the first camera and the light source assembly are disposed at a lower portion of the lens barrel assembly, and the second camera is disposed at an upper portion of the lens barrel assembly.

In a possible implementation, a housing is further included, the two lens barrel assemblies are disposed in the housing, a first space for accommodating eyeglasses worn by the user is provided between a first side of the housing and the lens barrel assemblies, and the first side of the housing is a side of the housing facing eyes of the user when the head-mounted virtual reality device is worn on the eyes of the user;

in the lens barrel assembly and the eye movement recognition assembly that correspond to each other, the first camera is located at a lower portion of an end, in a first direction, of the first space, and is disposed on the housing, and the first direction is a direction of a connection line between centers of the two lens barrel assemblies.

In a possible implementation, in the lens barrel assembly and the eye movement recognition assembly that correspond to each other, the second camera is located at a side close to the other lens barrel assembly, and is disposed on the housing.

In a possible implementation, in the lens barrel assembly and the eye movement recognition assembly that correspond to each other, the light source assembly is disposed directly below a central axis of the lens barrel assembly, and is disposed on the housing.

In a possible implementation, the two eye movement recognition assemblies respectively correspond to the two eyes of the user;

the processor obtains coordinates of centers of irises of the two eyes of the user respectively based on information fed back by the two eye movement recognition assemblies;

the processor obtains an interpupillary distance based on the coordinates of the centers of the irises of the two eyes of the user.

In a possible implementation, the light source assembly includes a vertical cavity surface emitting laser and a diffractive optical element, the diffractive optical element includes a plurality of longitudinal lines and transverse lines that vertically intersect each other, and when the head-mounted virtual reality device is worn on the eyes of the user, light emitted by the vertical cavity surface emitting laser is emitted to the eye of the user through the plurality of longitudinal lines and transverse lines that vertically intersect each other of the diffractive optical element, and a projection area including a plurality of longitudinal lines and transverse lines that vertically intersect each other is formed on the eye of the user.

In a possible implementation, the projection area covers at least a square area with a length and a width of 28 mm.

In a possible implementation, a distance that the light emitted by the light source assembly illuminates an eyeball of the user is 25 mm to 27 mm;

the diffractive optical element includes more than 21 longitudinal lines and more than 21 transverse lines, and a spacing between two adjacent longitudinal lines and a spacing between two adjacent transverse lines are 3.5 mm to 5 mm.

In a possible implementation, the vertical cavity surface emitting laser is pulse-driven with a pulse width of 2 μs, a pulse duty cycle of 0.06% and a frequency of 30 Hz.

In a possible implementation, each of the first camera and the second camera has a field of view of 90°, a depth of field of 20 mm to 40 mm, a resolution greater than 400×400, and a resolving power that a value of modulation transfer function of a full field of view is greater than 0.5 at a frequency of 56 lp/mm.

BRIEF DESCRIPTION OF DRAWINGS

The accompanying drawings herein are incorporated into and constitute a part of this specification, show embodiments consistent with the present disclosure, and are used in conjunction with the description to explain the principles of the present disclosure.

Figure 1:
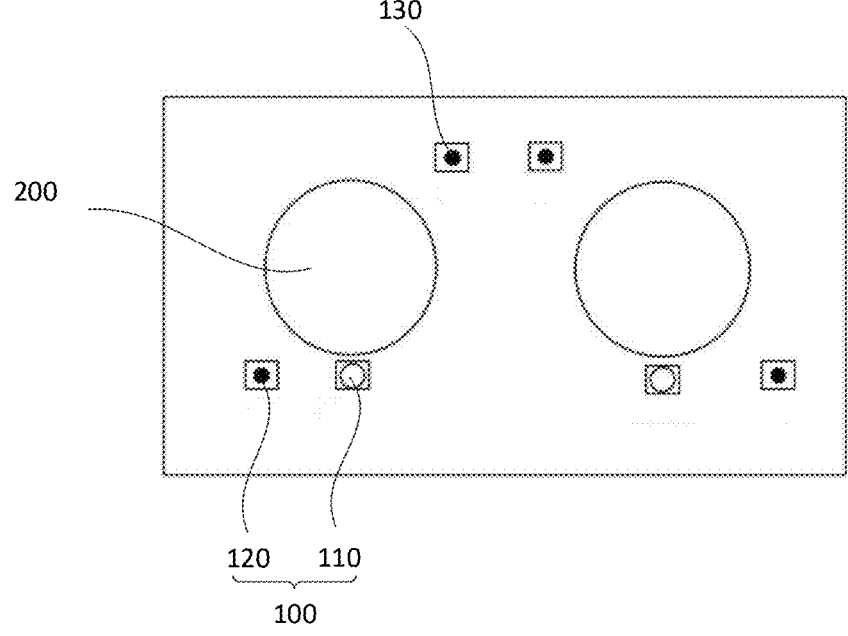
FIG. 1 is a schematic diagram of a head-mounted virtual reality device according to an embodiment of the present disclosure.

DESCRIPTION OF REFERENCE SIGNS 100 eye movement recognition assembly;
110 light source assembly; 120 first camera; 130 second camera;
200 lens barrel assembly;
210 display screen; 220 lens barrel; 230 convex lens;
300 eyeglasses;

310 frame; and
400 housing.

The foregoing accompanying drawings show the specific embodiments of the present disclosure, and more detailed descriptions are provided later. These drawings and the written description are not intended to limit the scope of ideas of the present disclosure in any way, but rather explain the concept of the present disclosure to those skilled in the art through reference to specific embodiments.

DESCRIPTION OF EMBODIMENTS

As described in the background art, in the related art, an eyeball tracking apparatus of a head-mounted virtual reality device can determine a sight direction and an interpupillary distance of a user based on eyeball positions of the user. However, the eyeball tracking apparatus in the related art has problems of high calibration complexity and low calibration accuracy. Through research, the inventors have found that if the eyeball tracking apparatus of the head-mounted virtual reality device includes an infrared camera and a plurality of infrared emission diodes, the plurality of infrared emission diodes cooperate with the infrared camera to implement an eye movement recognition function of the head-mounted virtual reality device, and a specific manner is as follows. When the head-mounted virtual reality device is worn on the eyes of the user, the plurality of infrared emission diodes emit light rays to the eyeballs of the user to form reflected light spots on the eyeballs of the user. The infrared camera photographs the reflected light spots formed on the eyeballs of the user, and then calculates positions of centers of pupils based on an optical calculation method, to obtain an interpupillary distance of the user. The head-mounted virtual reality device adjusts an IPD value of the head-mounted virtual reality device based on the interpupillary distance of the user. However, since the infrared camera is usually disposed on a housing of the head-mounted virtual reality device, it is limited by a photographing angle thereof, and when the infrared camera photographs the reflected light spots formed on the eyeballs of the user, there is often a situation where only some of the reflected light spots are photographed. This makes it difficult for the images captured by the infrared camera to meet the requirements of the optical calculation method, resulting in that it is difficult to calculate the interpupillary distance. Therefore, the solution of obtaining the interpupillary distance of the user through the cooperation of the plurality of infrared emission diodes and the infrared camera cannot obtain the interpupillary distance at a set frequency, affecting the experience of the user. In addition, when the infrared camera photographs the reflected light spots formed on the eyeballs of the user, interference light spots on the eyeballs of the user are often photographed, affecting the accuracy of the interpupillary distance measurement.

In view of this, in the embodiments of the present disclosure, an iris position is recognized through a solution of a binocular camera and 3D structured light, to obtain the interpupillary distance of the user. Compared with the solution of obtaining the interpupillary distance of the user through the cooperation of the plurality of infrared emission diodes and the infrared camera, the measurement accuracy of the solution is significantly improved, and the interpupillary distance can be obtained at the set frequency, improving the experience of the user.

The following clearly and completely describes the technical solutions in the embodiments of the present disclosure with reference to the accompanying drawings in the embodiments of the present disclosure. It is clear that the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 2:
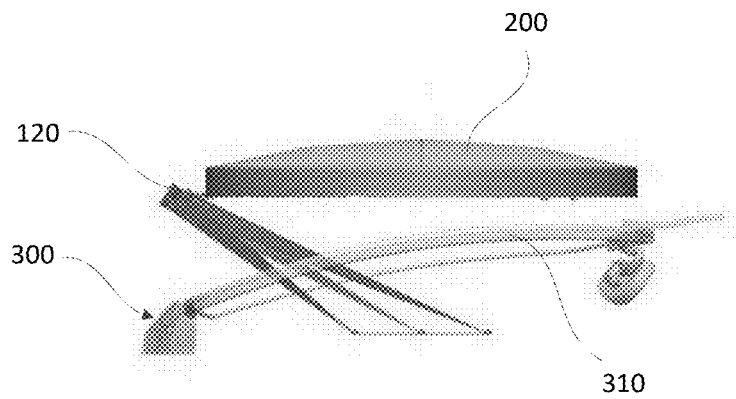
FIG. 2 is a light ray diagram when a first camera is located at a first position.
Figure 3:
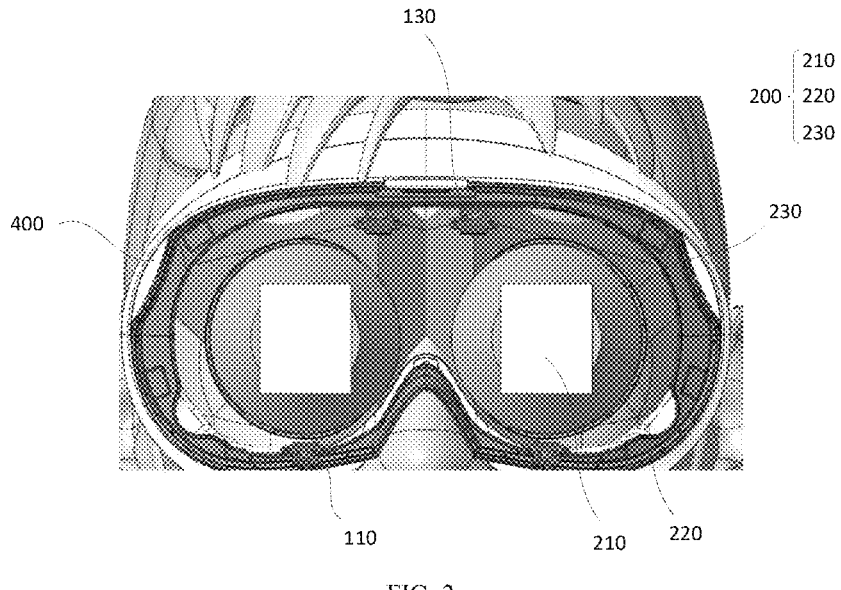
FIG. 3 is a front view of a user wearing the head-mounted virtual reality device according to an embodiment of the present disclosure.

FIG. 1 is a schematic diagram of a head-mounted virtual reality device according to an embodiment of the present disclosure; FIG. 2 is a light ray diagram when a first camera is located at a first position; and FIG. 3 is a front view of a user wearing the head-mounted virtual reality device according to an embodiment of the present disclosure.

As shown in FIG. 1, the head-mounted virtual reality device provided in this embodiment includes an eye movement recognition assembly 100 and a processor. The eye movement recognition assembly 100 includes a light source assembly 110, a first camera 120, and a second camera 130. The light source assembly 110 is configured to: when the head-mounted virtual reality device is used, project a plurality of strip-shaped light rays to an eye of a user, where at least some of the strip-shaped light rays are projected to an iris of the user. The first camera 120 is configured to: when the head-mounted virtual reality device is used, capture a first eye image of the user, where the first eye image includes a reflected pattern formed by the strip-shaped light rays on the eye of the user. The second camera 130 is configured to: when the head-mounted virtual reality device is used, capture a second eye image of the user, where the second eye image includes a reflected pattern formed by the strip-shaped light rays on the eye of the user. The processor is in signal connection with the first camera 120 and the second camera 130 respectively, and the processor is configured to determine an eye depth map with depth information based on the first eye image and the second eye image, and determine coordinates of a center of the iris of the user based on the eye depth map.

The head-mounted virtual reality device provided in the embodiments of the present disclosure obtains position coordinates of part of an iris edge by obtaining an eye depth map with depth information based on the fact that a depth of an iris edge is different from a depth of a sclera, and determines coordinates of the center of the iris of the user based on the position coordinates of the iris edge.

In the embodiments of the present disclosure, for example, the head-mounted virtual reality device provided in the embodiments of the present disclosure may determine the eye depth map with the depth information based on the first eye image and the second eye image in the following manner.

A first eye depth map with depth information is determined based on the first eye image, and/or a second eye depth map with depth information is determined based on the second eye image. That is, the first camera 120 cooperates with the light source assembly 110, the first camera 120 captures the first eye image including the strip-shaped light rays emitted by the light source assembly 110, the first eye image is processed by the processor to obtain the first eye depth map with the depth information, and/or the second camera 130 cooperates with the light source assembly 110, the second camera 130 captures the second eye image including the strip-shaped light rays emitted by the light source assembly 110, and the second eye image is processed by the processor to obtain the second eye depth map with the depth information.

A third eye depth map with depth information is determined based on the first eye image and the second eye image. That is, the first eye image captured by the first camera 120 and the second eye image are processed by the processor to obtain another depth map with depth information, that is, the third eye depth map.

The third eye depth map is fused with at least one of the first eye depth map and the second eye depth map to obtain an eye depth map with depth information. A resolution of the eye depth map obtained after two or three depth maps are fused is greater than a resolution of a single depth map. After the two or three depth maps are fused, the coordinates of the center of the iris of the user are obtained based on the fused depth map.

Beneficial effects of the embodiments of the present disclosure are as follows. In the head-mounted virtual reality device provided in the embodiments of the present disclosure, the first eye image and the second eye image including the strip-shaped light rays emitted by the light source assembly are obtained through the cooperation of the light source assembly, the first camera, and the second camera, the processor determines the eye depth map with the depth information based on the first eye image and the second eye image, and then determines the coordinates of the center of the iris of the user based on the eye depth map. In this manner of obtaining the coordinates of the center of the iris of the user, the accuracy of the head-mounted virtual reality device in determining the coordinates of the center of the iris of the user is greatly improved, improving the experience of the user.

In the foregoing manner of determining the eye depth map with the depth information based on the first eye image and the second eye image, the second eye image and the first eye image have an overlapping area, where the overlapping area includes an image formed by at least part of the iris. That is, the eye image captured by the first camera 120 includes an image formed by at least part of the iris, the eye image captured by the second camera 130 includes an image formed by at least part of the iris, and the image formed by iris in the eye image captured by the first camera 120 and the image formed by iris in the eye image captured by the second camera 130 have an overlapping part.

The foregoing manner of determining the eye depth map with the depth information based on the first eye image and the second eye image includes the following three cases:

Case 1:

A first eye depth map with depth information is determined based on the first eye image.

Exemplarily, in the embodiments of the present disclosure, a manner of obtaining the first eye depth map with the depth information is to obtain the first eye depth map with the depth information based on the first eye image captured by the first camera 120 that includes the strip-shaped light rays emitted by the light source assembly 110, based on a 3D structured light principle. That is, the head-mounted virtual reality device obtains the first eye depth map with the depth information based on the 3D structured light principle through analysis of the processor through the cooperation of the first camera 120 and the light source assembly 110.

A third eye depth map with depth information is determined based on the first eye image and the second eye image.

Exemplarily, in the embodiments of the present disclosure, a manner of obtaining the third eye depth map with the depth information is to obtain the third eye depth map with the depth information based on the first eye image captured by the first camera 120 and the second eye image captured by the second camera 130 based on a binocular camera principle. That is, the head-mounted virtual reality device obtains the third eye depth map with the depth information based on the binocular camera principle through analysis of the processor through the cooperation of the first camera 120 and the second camera 130.

The third eye depth map is fused with the first eye depth map to obtain an eye depth map with depth information.

Exemplarily, in the embodiments of the present disclosure, a manner of fusing the third eye depth map with the first eye depth map may be to fuse the third eye depth map and the first eye depth map in an image feature fusion manner, to obtain a depth map, a resolution of the depth map is greater than resolutions of the third eye depth map and the first eye depth map, and after the third eye depth map and the first eye depth map are fused, the coordinates of the center of the iris of the user are obtained based on the fused depth map.

In other words, in the forgoing first case of the manner of determining the eye depth map with the depth information based on the first eye image and the second eye image, the first eye depth map with the depth information is obtained based on the 3D structured light principle, the third eye depth map with the depth information is obtained based on the binocular camera principle, and the third eye depth map and the first eye depth map form a depth map with a higher resolution, which can improve the accuracy of obtaining the coordinates of the center of the iris. Compared with the solution of obtaining the interpupillary distance of the user through the cooperation of the plurality of infrared emission diodes and the infrared camera in the related art, the solution of obtaining the interpupillary distance of the user by the head-mounted virtual reality device can improve the accuracy by more than 10 times, and the head-mounted virtual reality device can obtain the interpupillary distance at a set frequency, improving the experience of the user.

Case 2:

A second eye depth map with depth information is determined based on the second eye image.

In the embodiments of the present disclosure, a manner of obtaining the second eye depth map with the depth information is the same as the manner of obtaining the first eye depth map with the depth information, and is not described herein again.

A third eye depth map with depth information is determined based on the first eye image and the second eye image. This process is the same as the process of obtaining the third eye depth map with the depth information described above, and is not described herein again.

The third eye depth map is fused with the second eye depth map to obtain an eye depth map with depth information. Similarly, in the embodiments of the present disclosure, a manner of fusing the third eye depth map with the second eye depth map is the same as the manner of fusing the third eye depth map with the first eye depth map described above, a resolution of a depth map obtained after the third eye depth map and the second eye depth map are fused is greater than resolutions of the third eye depth map and the second eye depth map, and after the third eye depth map and the second eye depth map are fused, the coordinates of the center of the iris of the user are obtained based on the fused depth map.

In other words, in the forgoing second case of the manner of determining the eye depth map with the depth information based on the first eye image and the second eye image, the second eye depth map with the depth information is obtained based on the 3D structured light principle, the third eye depth map with the depth information is obtained based on the binocular camera principle, and the third eye depth map and the second eye depth map are fused to form a depth map with a higher resolution, which can also increase the accuracy of obtaining the coordinates of the center of the iris.

Case 3:

A first eye depth map with depth information is determined based on the first eye image, and a second eye depth map with depth information is determined based on the second eye image. That is, the head-mounted virtual reality device obtains the first eye depth map with the depth information based on the 3D structured light principle through analysis of the processor through the cooperation of the first camera 120 and the light source assembly 110, and obtains the second eye depth map with the depth information based on the 3D structured light principle through analysis of the processor through the cooperation of the second camera 130 and the light source assembly 110.

A third eye depth map with depth information is determined based on the first eye image and the second eye image. This process is the same as the process of obtaining the third eye depth map with the depth information described above, and is not described herein again.

The third eye depth map is fused with the first eye depth map and the second eye depth map to obtain an eye depth map with depth information.

Exemplarily, in the embodiments of the present disclosure, a manner of fusing the first eye depth map, the second eye depth map, and the third eye depth map may be to fuse the first eye depth map, the second eye depth map, and the third eye depth map in an image feature fusion manner, to obtain a depth map, a resolution of the depth map is greater than resolutions of the first eye depth map, the second eye depth map, and the third eye depth map, and after the first eye depth map, the second eye depth map, and the third eye depth map are fused, the coordinates of the center of the iris of the user are obtained based on the fused depth map. Compared with the manner of fusing two depth maps, this manner can obtain the coordinates of the center of the iris with higher accuracy.

In addition, a manner of obtaining the coordinates of the center of the iris of the user based on the first eye depth map, the second eye depth map, and the third eye depth map may alternatively be to compare the first eye depth map and the second eye depth map, select an image with higher clarity, and fuse the third eye depth map and the image with higher clarity after comparison in an image feature fusion manner to obtain a depth map.

In other words, in the foregoing third case of the manner of determining the eye depth map with the depth information based on the first eye image and the second eye image, the first eye depth map with the depth information and the second eye depth map with the depth information are obtained based on the 3D structured light principle, the third eye depth map with the depth information is obtained based on the binocular camera principle, and the three depth maps are fused or the third eye depth map and the depth map with higher resolution in the first eye depth map and the second eye depth map are fused to form a depth map with a higher resolution, which can also increase the accuracy of obtaining the coordinates of the center of the iris.

In an embodiment, the head-mounted virtual reality device further includes two lens barrel assemblies 200, the two lens barrel assemblies 200 respectively correspond to two eyes of the user, and when the head-mounted virtual reality device is used, the two lens barrel assemblies 200 display a virtual scene to the user.

The head-mounted virtual reality device further includes two lens barrel assemblies 200, the two lens barrel assemblies 200 respectively correspond to two eyes of the user, and when the head-mounted virtual reality device is used, the two lens barrel assemblies 200 display a virtual scene to the user. That is, one of the two lens barrel assemblies 200 corresponds to a left eye of the user, to display a virtual image to the left eye of the user, and the other one of the two lens barrel assemblies 200 corresponds to a right eye of the user, to display a virtual image to the right eye of the user. In this embodiment, one of the two lens barrel assemblies 200 corresponds to one eye movement recognition assembly 100. In the lens barrel assembly 200 and the eye movement recognition assembly 100 that correspond to each other, both the light source assembly 110 and the first camera 120 are disposed at a lower portion of the lens barrel assembly 200, and the second camera 130 is disposed at an upper portion of the lens barrel assembly 200.

In some embodiments of the present disclosure, the two eye movement recognition assemblies 100 respectively correspond to the two eyes of the user, the processor obtains coordinates of centers of irises of the two eyes of the user respectively based on information fed back by the two eye movement recognition assemblies 100, and then obtains an interpupillary distance based on the coordinates of the centers of the irises of the two eyes of the user. The information fed back by the two eye movement recognition assemblies 100 is the first eye images of the corresponding eyes captured by the first cameras 120 of the two eye movement recognition assemblies 100, and the second eye images of the corresponding eyes captured by the second cameras 130 of the two eye movement recognition assemblies 100. In other words, the head-mounted virtual reality device provided in the embodiments of the present disclosure has an eye movement recognition function, and the head-mounted virtual reality device provided in the embodiments of the present disclosure obtains the interpupillary distance of the user by analyzing eye movement of the user, and then adjusts an IPD value of the head-mounted virtual reality device based on the interpupillary distance of the user.

In a possible implementation, the two lens barrel assemblies 200 are respectively a first lens barrel assembly and a second lens barrel assembly, the eye movement recognition assembly 100 corresponding to the first lens barrel assembly is a first eye movement recognition assembly, and the eye movement recognition assembly 100 corresponding to the second lens barrel assembly is a second eye movement recognition assembly. The first camera 120 and the light source assembly 110 of the first eye movement recognition assembly are disposed at a lower portion of the first lens barrel assembly, and the second camera 130 of the first eye movement recognition assembly is disposed at an upper portion of the first lens barrel assembly. The first camera 120 and the light source assembly 110 of the second eye movement recognition assembly are disposed at a lower portion of the second lens barrel assembly, and the second camera 130 of the second eye movement recognition assembly is disposed at an upper portion of the second lens barrel assembly. The first eye movement recognition assembly and the second eye movement recognition assembly are mirror-symmetrical relative to a first plane, the first cameras 120 are disposed at lower portions, the second cameras 130 are disposed at upper portions, and the two cameras capture at different viewing angles, which is conducive to the accuracy of eye movement recognition. In addition, the first eye movement recognition assembly and the second eye movement recognition assembly are mirror-symmetrical relative to the first plane, so that an angle at which the first camera 120 of the first eye movement recognition assembly captures the first eye image is the same as an angle at which the first camera 120 of the second eye movement recognition assembly captures the first eye image, and an angle at which the second camera 130 of the first eye movement recognition assembly captures the second eye image is the same as an angle at which the second camera 130 of the second eye movement recognition assembly captures the second eye image, which is conducive to the accuracy of an analysis result of the processor, that is, can make the eye movement recognition more accurate and the measured IPD value more accurate.

As shown in FIG. 3, the lens barrel assembly 200 includes a lens barrel 220, and a display screen 210 and a convex lens 230 that are arranged on two sides of the lens barrel 220 in an axial direction of the lens barrel 220, where the display screen 210 is arranged on a side of the lens barrel 220 away from the eyes of the user, and the convex lens 230 is arranged on a side of the lens barrel 220 facing the eyes of the user.

With continued reference to FIG. 3, the head-mounted virtual reality device further includes a housing 400, the two lens barrel assemblies 200 are disposed in the housing 400, a first space for accommodating eyeglasses 300 worn by the user is provided between a first side of the housing 400 and the lens barrel assembly 200, and the first side of the housing 400 is a side of the housing 400 facing the eyes of the user when the head-mounted virtual reality device is worn on the eyes of the user. In other words, the head-mounted virtual reality device provided in the embodiments of the present disclosure can be adapted to a user wearing the eyeglasses 300, improving the experience of the user wearing the eyeglasses 300.

It should be noted that the eyeglasses 300 worn by the user may be myopia glasses 300, hyperopia glasses 300, or presbyopic glasses 300.

In a possible implementation, the first camera 120 is an eye-tracking (ET) camera, and the second camera 130 is a face-tracking (Face-Tracking, FT) camera.

As shown in FIG. 2, to prevent an edge of the eyeglasses 300 worn by the user from blocking a viewing angle of the first camera 120 for capturing an eye image of the user, in the lens barrel assembly 200 and the eye movement recognition assembly 100 that correspond to each other, the first camera 120 is located at a lower portion of an end, in a first direction, of the first space, and is disposed on the housing 400, and the first direction is a direction of a connection line between centers of the two lens barrel assemblies 200. That is, the first camera 120 of the first eye movement recognition assembly is located at a lower portion of an end, in the first direction, of the first space, and is disposed on the housing 400. Correspondingly, based on the fact that the first eye movement recognition assembly and the second eye movement recognition assembly are mirror-symmetrical relative to a first plane, the first camera 120 of the second eye movement recognition assembly is located at a lower portion of the other end, in the first direction, of the first space, and is disposed on the housing 400. That is, as shown in FIG. 3, when the head-mounted virtual reality device is worn on the eyes of the user, the first eye movement recognition assembly corresponds to a right eye of the user, and the first camera 120 of the first eye movement recognition assembly is located at a lower portion of a right edge of a frame 310 of the eyeglasses 300 of the user and is disposed on the housing 400. In this arrangement, when the first camera 120 captures an image of a right eye of the user, an edge of the eyeglasses 300 worn by the user cannot block a viewing angle of the first camera 120 for capturing the eye image of the user, improving the accuracy of eye movement recognition of the head-mounted virtual reality device.

It should be noted that FIG. 2 is a light ray diagram when the first camera 120 is located at a first position, where the first position is a position at a lower left portion of a left lens of the eyeglasses 300 of the user and at an edge of the housing 400 when the head-mounted virtual reality device is worn on the eyes of the user.

In the embodiments of the present disclosure, as shown in FIG. 1, in the lens barrel assembly 200 and the eye movement recognition assembly 100 that correspond to each other, the second camera 130 is located at a side close to the other lens barrel assembly 200, and is disposed on the housing 400. That is, the second camera 130 of the first eye movement recognition assembly is disposed at an upper portion of the first lens barrel assembly and at a side close to the second lens barrel assembly. That is, when the head-mounted virtual reality device is worn on the eyes of the user, the second camera 130 of the first eye movement recognition assembly and the second camera 130 of the second eye movement recognition assembly are respectively located on two sides of a nose bridge of the user.

With continued reference to FIG. 1, in the lens barrel assembly 200 and the eye movement recognition assembly 100 that correspond to each other, the light source assembly 110 is disposed directly below a central axis of the lens barrel assembly 200, and is disposed on the housing 400. That is, the light source assembly 110 of the first eye movement recognition assembly is disposed at a lower portion of the first lens barrel assembly and directly below the central axis of the first lens barrel assembly. Correspondingly, based on the fact that the first eye movement recognition assembly and the second eye movement recognition assembly are mirror-symmetrical relative to the first plane, the light source assembly 110 of the second eye movement recognition assembly is disposed at a lower portion of the second lens barrel assembly and directly below the central axis of the second lens barrel assembly. In this arrangement, the light source assembly 110 can project structured light stripes with small distortion on eyes of the user, which is conducive to improving the accuracy of interpupillary distance measurement.

In the embodiments of the present disclosure, exemplarily, the light source assembly 110 includes a vertical cavity surface emitting laser and a diffractive optical element, the diffractive optical element includes a plurality of longitudinal lines and transverse lines that vertically intersect each other, and when the head-mounted virtual reality device is worn on the eyes of the user, light emitted by the vertical cavity surface emitting laser is emitted to an eye of the user through the plurality of longitudinal lines and transverse lines that vertically intersect each other of the diffractive optical element, and a projection area including a plurality of longitudinal lines and transverse lines that vertically intersect each other is formed on the eye of the user. That is, a light exit surface of the diffractive optical element is provided with a grid-shaped pattern, the light emitted by the vertical cavity surface emitting laser illuminates the diffractive optical element, and is emitted to the eye of the user through the plurality of longitudinal lines and transverse lines that vertically intersect each other of the diffractive optical element, and grid-shaped reflected light spots are formed on the eye of the user.

To enable the second camera 130 disposed at the upper portion of the lens barrel assembly 200 to capture an eye image including the grid-shaped reflected light spots, the projection area covers at least a square area with a length and a width of 28 mm. The square area with the length and the width of 28 mm can cover an eye of the user, so that the second camera 130 disposed at the upper portion of the lens barrel assembly 200 can capture the eye image including the grid-shaped reflected light spots.

To enable the light source assembly 110 and the first camera 120 to cooperate to obtain a more accurate first eye depth map, and to enable the light source assembly 110 and the second camera 130 to cooperate to obtain a more accurate second eye depth map, a distance that the light emitted by the light source assembly 110 illuminates the eyeball of the user is 25 mm to 27 mm. The diffractive optical element includes more than 21 longitudinal lines and more than 21 transverse lines, and a spacing between two adjacent longitudinal lines and a spacing between two adjacent transverse lines are 3.5 mm to 5 mm.

In the embodiments of the present disclosure, exemplarily, the vertical cavity surface emitting laser is pulse-driven with a pulse width of 2 $\mu$p, a pulse duty cycle of 0.06% and a frequency of 30 Hz. This configuration can reduce power consumption of the vertical cavity surface emitting laser.

Exemplarily, to enable the eye images captured by the first camera 120 and the second camera 130 to meet requirements and be free from the effects of installation errors and dark edges of the captured images, a field of view of each of the first camera 120 and the second camera 130 is 90°. In addition, based on positions at which the first camera 120 and the second camera 130 are disposed, each of the first camera 120 and the second camera 130 has a depth of field of 20 mm to 40 mm, a resolution greater than 400×400, and a resolving power that a value of modulation transfer function of a full field of view is greater than 0.5 at a frequency of 56 lp/mm. This configuration can enable the first camera 120 and the second camera 130 to capture good and required eye images, and cooperate with the light source assembly 110 to obtain the depth map with the depth information.

Exemplarily, a relationship between a minimum identifiable line width and a depth of field of the first camera 120 and the second camera 130 is shown in Table 1:

TABLE 1

| Relationship between a minimum identifiable line width and a depth of field of the first camera and the second camera | |
| --- | --- |
| Working distance (mm) | Minimum line width (mm) |
| 20 | 0.19 |
| 25 | 0.24 |
| 30 | 0.29 |
| 35 | 0.34 |
| 40 | 0.39 |

The present disclosure is intended to cover any modification, use, or adaption of the present disclosure. These modifications, use, or adaption follow the general principle of the present disclosure and include common knowledge or conventional technical means in the art that is not disclosed in the present disclosure. The specification and embodiments are only to be considered as exemplary, and the true scope and spirit of the present disclosure are indicated by the following claims.

It should be understood that the present disclosure is not limited to the precise structures that have been described above and shown in the accompanying drawings, and various modifications and changes can be made without departing from the scope thereof. The scope of the present disclosure is limited only by the appended claims.

The invention claimed is:

1. A head-mounted virtual reality device, comprising an eye movement recognition assembly and a processor, wherein the eye movement recognition assembly comprises a light source assembly, a first camera, and a second camera;

the light source assembly is configured to project, when the head-mounted virtual reality device is used, a plurality of strip-shaped light rays to an eye of a user, wherein at least some of the strip-shaped light rays are projected to an iris of the user;

the first camera is configured to capture, when the head-mounted virtual reality device is used, a first eye image of the user, wherein the first eye image comprises a reflected pattern formed by the strip-shaped light rays on the eye of the user;

the second camera is configured to capture, when the head-mounted virtual reality device is used, a second eye image of the user, wherein the second eye image comprises a reflected pattern formed by the strip-shaped light rays on the eye of the user; and the processor is in signal connection with the first camera and the second camera respectively, and is configured to determine an eye depth map with depth information based on the first eye image and the second eye image, and determine coordinates of a center of the iris of the user based on the eye depth map;

wherein the second eye image and the first eye image have an overlapping area, wherein the overlapping area comprises an image formed by at least part of the iris; and the processor is specifically configured to:

determine a first eye depth map with depth information by using a three-dimensional (3D) structured light principle based on the first eye image, and determine a second eye depth map with depth information by using the 3D structured light principle based on the second eye image;

determine a third eye depth map with depth information based on the first eye image and the second eye image; and fuse the third eye depth map with at least one of the first eye depth map and the second eye depth map to obtain an eye depth map with depth information.

2. The head-mounted virtual reality device according to claim 1, further comprising two lens barrel assemblies, wherein the two lens barrel assemblies respectively correspond to two eyes of the user, and when the head-mounted virtual reality device is used, the two lens barrel assemblies display a virtual scene to the user;

wherein the eye movement recognition assembly comprises two eye movement recognition assemblies respectively corresponding to the two eyes of the user;

each of the two lens barrel assemblies corresponds to one eye movement recognition assembly of the two eye movement recognition assemblies, and in the lens barrel assembly and the eye movement recognition assembly that correspond to each other, the first camera and the light source assembly are disposed at a lower portion of the lens barrel assembly, and the second camera is disposed at an upper portion of the lens barrel assembly.

3. The head-mounted virtual reality device according to claim 2, further comprising a housing, wherein the two lens barrel assemblies are disposed in the housing, a first space for accommodating eyeglasses worn by the user is provided between a first side of the housing and the lens barrel assemblies, and the first side of the housing is a side of the housing facing the eyes of the user when the head-mounted virtual reality device is worn on the eyes of the user; and in the lens barrel assembly and the eye movement recognition assembly that correspond to each other, the first camera is located at a lower portion of an end, in a first direction, of the first space, and is disposed on the housing, wherein the first direction is a direction of a connection line between centers of the two lens barrel assemblies.

4. The head-mounted virtual reality device according to claim 3, wherein in the lens barrel assembly and the eye movement recognition assembly that correspond to each other, the second camera is located at a side close to the other lens barrel assembly, and is disposed on the housing.

5. The head-mounted virtual reality device according to claim 3, wherein in the lens barrel assembly and the eye movement recognition assembly that correspond to each other, the light source assembly is disposed directly below a central axis of the lens barrel assembly, and is disposed on the housing.

6. The head-mounted virtual reality device according to claim 2, wherein the processor is configured to: obtain coordinates of centers of irises of the two eyes of the user respectively based on information fed back by the two eye movement recognition assemblies, and obtain an interpupillary distance based on the coordinates of the centers of the irises of the two eyes of the user.

7. The head-mounted virtual reality device according to claim 1, wherein the light source assembly comprises a vertical cavity surface emitting laser and a diffractive optical element, the diffractive optical element comprises a plurality of longitudinal lines and transverse lines that vertically intersect each other, and when the head-mounted virtual reality device is worn on eyes of the user, light emitted by the vertical cavity surface emitting laser is emitted to the eye of the user through the plurality of longitudinal lines and transverse lines that vertically intersect each other of the diffractive optical element, and a projection area comprising a plurality of longitudinal lines and transverse lines that vertically intersect each other is formed on the eye of the user.

8. The head-mounted virtual reality device according to claim 7, wherein the projection area covers at least a square area with a length and a width of 28 mm.

9. The head-mounted virtual reality device according to claim 7, wherein a distance that the light emitted by the vertical cavity surface emitting laser illuminates an eyeball of the user is 25 mm to 27 mm;

the diffractive optical element comprises more than 21 longitudinal lines and more than 21 transverse lines, and a spacing between two adjacent longitudinal lines and a spacing between two adjacent transverse lines are 3.5 mm to 5 mm.

10. The head-mounted virtual reality device according to claim 7, wherein the vertical cavity surface emitting laser is pulse-driven with a pulse width of 2 μs, a pulse duty cycle of 0.06% and a frequency of 30 Hz.

11. The head-mounted virtual reality device according to claim 1, wherein each of the first camera and the second camera has a field of view of 90°, a depth of field of 20 mm to 40 mm, a resolution greater than 400×400, and a resolving power that a value of modulation transfer function of a full field of view is greater than 0.5 at a frequency of 56 lp/mm.

12. The head-mounted virtual reality device according to claim 1, wherein the eye depth map with depth information is obtained by fusing the third eye depth map with the higher-resolution one of the first eye depth map and the second eye depth map.

13. The head-mounted virtual reality device according to claim 2, wherein the two eye movement recognition assemblies comprise a first eye movement recognition assembly and a second eye movement recognition assembly, and the first eye movement recognition assembly and the second eye movement recognition assembly are mirror-symmetrical relative to a first plane along a first direction, wherein the first direction is a direction of a connection line between centers of the two lens barrel assemblies.

14. The head-mounted virtual reality device according to claim 1, wherein the first camera and the second camera are eye-tracking (ET) camera.

\* \* \* \* \*